United States Patent
Brombach

(10) Patent No.: US 11,491,888 B2
(45) Date of Patent: Nov. 8, 2022

(54) CHARGING STATION FOR CHARGING ELECTRIC VEHICLES, COMPRISING A CONTROL DEVICE FOR DETERMINING AN EQUIVALENT STORAGE CAPACITY OF A VIRTUAL PRECHARGE STORE, AND ASSOCIATED METHOD

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 137 days.

(21) Appl. No.: 17/048,016

(22) PCT Filed: Apr. 12, 2019

(86) PCT No.: PCT/EP2019/059449
§ 371 (c)(1),
(2) Date: Oct. 15, 2020

(87) PCT Pub. No.: WO2019/201781
PCT Pub. Date: Oct. 24, 2019

(65) Prior Publication Data
US 2021/0114478 A1   Apr. 22, 2021

(30) Foreign Application Priority Data
Apr. 17, 2018   (DE) .................. 10 2018 109 078.1

(51) Int. Cl.
*B60L 53/63*   (2019.01)
*B60L 53/67*   (2019.01)
*B60L 53/62*   (2019.01)

(52) U.S. Cl.
CPC .............. *B60L 53/63* (2019.02); *B60L 53/62* (2019.02); *B60L 53/67* (2019.02)

(58) Field of Classification Search
CPC ....................................................... B60L 53/63
(Continued)

(56) References Cited

U.S. PATENT DOCUMENTS

2007/0118255 A1 * 5/2007 Wakashiro ............ B60W 20/13
701/22
2007/0282495 A1   12/2007 Kempton et al.
(Continued)

FOREIGN PATENT DOCUMENTS

WO   2016/120240 A1   8/2016

OTHER PUBLICATIONS

Jin et al., "Hierarchical microgrid energy management in an office building", Applied Energy 208, Oct. 14, 2017, pp. 480-494.
(Continued)

*Primary Examiner* — Jerry D Robbins
(74) *Attorney, Agent, or Firm* — Seed Intellectual Property Law Group LLP

(57) ABSTRACT

A charging station for charging electric vehicles, wherein the charging station comprises a network connection point, via which the charging station is connected to an electricity supply network, for the take-up of electric power from said electricity supply network, wherein the network connection point assumes a connection capacity value, up to which a maximum take-up of power from the electricity supply network can be executed by the charging station, at least one charging terminal, for the charging of one electric vehicle respectively, at least one controllable load to the at least one charging terminal, and a control device for controlling the charging station, wherein the control device is designed to determine an equivalent storage capacity of a virtual precharge store, and to control the charging of electric vehicles in accordance with the connection capacity value and the equivalent storage capacity, wherein the equivalent storage
(Continued)

capacity describes a value which corresponds to a storage capacity of a virtual electrical precharge store which, for a predefined charging period, can deliver an additional charging capacity, which is dictated by the storage capacity, in order to increase a charging capacity which is restricted by the connection capacity value.

19 Claims, 1 Drawing Sheet

(58) Field of Classification Search
    USPC .......................................................... 320/109
    See application file for complete search history.

(56) References Cited

U.S. PATENT DOCUMENTS

| | | | | |
|---|---|---|---|---|
| 2010/0179704 A1* | 7/2010 | Ozog | ...................... | H02J 3/322 |
| | | | | 703/2 |
| 2013/0229149 A1* | 9/2013 | Sortomme | ................ | H02J 7/00 |
| | | | | 320/109 |
| 2013/0335025 A1* | 12/2013 | Kuribayashi | ........... | B60L 53/63 |
| | | | | 320/109 |
| 2013/0335032 A1* | 12/2013 | Kuribayashi | ........... | B60L 53/64 |
| | | | | 320/137 |
| 2014/0139188 A1 | 5/2014 | Yonezawa et al. | | |
| 2016/0164329 A1* | 6/2016 | Hashimoto | ................ | H02J 7/02 |
| | | | | 700/295 |
| 2016/0167539 A1 | 6/2016 | Huang et al. | | |

OTHER PUBLICATIONS

Musio et al., "A Virtual Power Plant Management Model Based on Electric Vehicle Charging Infrastructure Distribution", 2012 3rd IEEE PES Innovative Smart Grid Technologies Europe (ISGT Europe), Berlin, pp. 1-7.

Palensky et al., "Demand Side Management: Demand Response, Intelligent Energy Systems, and Smart Loads", IEEE Transactions on Industrial Informatics, vol. 7, No. 3, Aug. 2011, pp. 381-388.

U.S. Appl. No. 17/048,014, filed Oct. 15, 2020.

\* cited by examiner

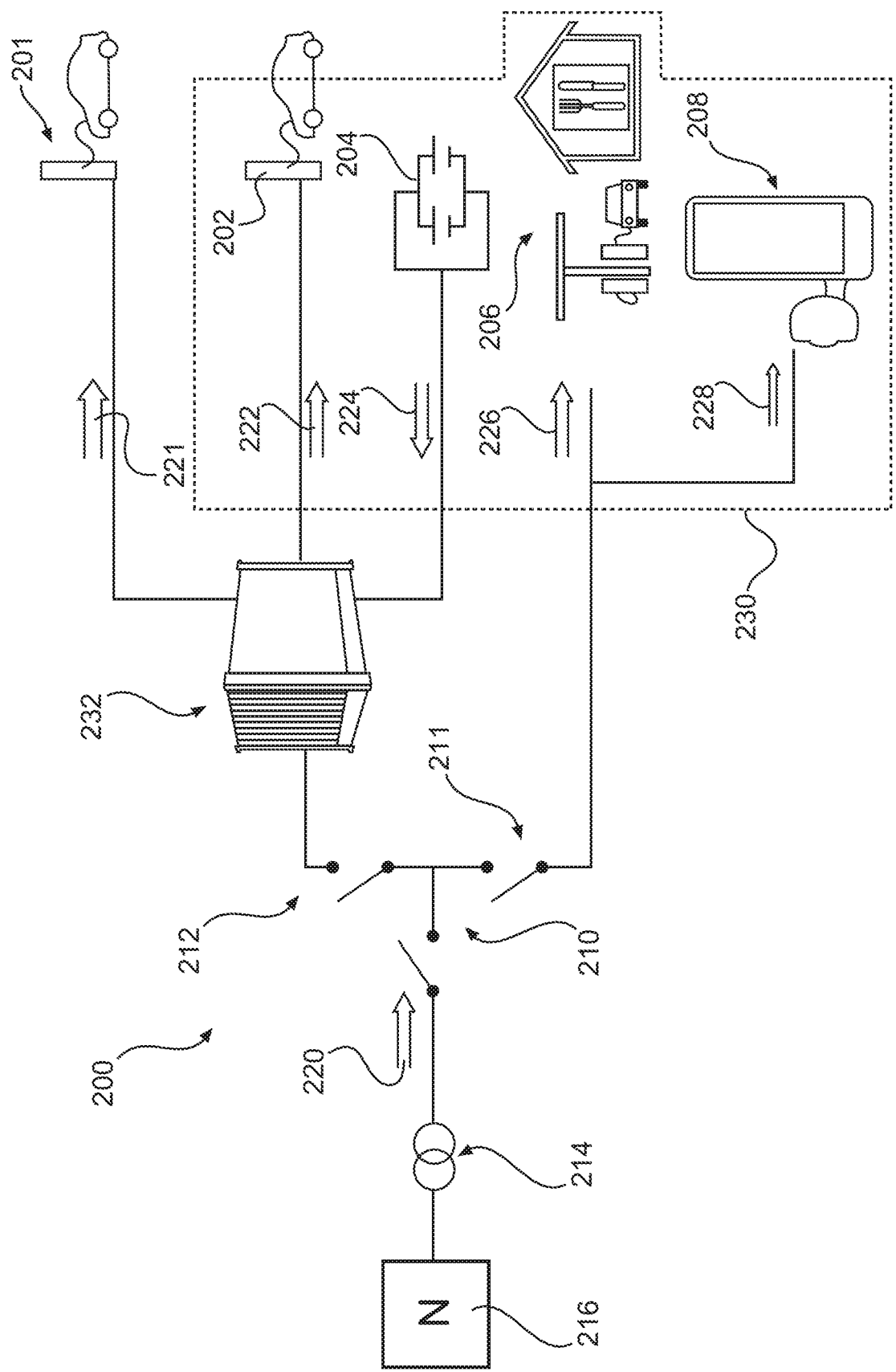

CHARGING STATION FOR CHARGING ELECTRIC VEHICLES, COMPRISING A CONTROL DEVICE FOR DETERMINING AN EQUIVALENT STORAGE CAPACITY OF A VIRTUAL PRECHARGE STORE, AND ASSOCIATED METHOD

BACKGROUND

Technical Field

The present invention relates to a charging station for charging electric vehicles. The present invention further relates to a method for controlling a charging station.

Description of the Related Art

Charging stations for the charging of electric vehicles are generally known. They are particularly designed to draw electric power from an electricity supply network, which is then employed on charging columns for the respective charging of individual electric vehicles. The growing number of electric vehicles, and particularly the rising demand for high-speed charging capability, are also associated with increased demand upon the electricity supply network for the delivery of the power required by charging stations. This can particularly affect distribution networks which are connected to transmission networks.

This growing demand for high-speed charging capability in charging stations for a rising number of electric vehicles is associated with demand for a corresponding high-speed charging infrastructure. Insofar as possible, this should be integrated in the electricity supply network or adapted thereto—this can also be described as network integration.

Network integration of an above-mentioned high-speed charging infrastructure of this type, in the interests of e-mobility, can thus entail the rapid exhaustion of the network connection capacity of specific distribution networks. However, this problem occurs particularly during peak load periods. During high-speed charging, in turn, peak loads of this type only occur on a very short-term basis. In an individual vehicle, a peak load of this type can sometimes be of only a few minutes' duration, particularly within the range of 5 to 10 minutes. In many cases, consequently, it is not worthwhile to rectify a capacity issue associated with network connection capacity by means of a network extension.

Instead, consideration is given to the installation of "precharge stores" which, at their network connection point, only draw such power from the electricity supply network as is provided at said connection point. However, this power take-up can be executed continuously, even if no electric vehicle is being charged or, at least, where no peak load is present. Any peak loads occurring can then be supplied from this precharge store. Thus, by means of such precharge stores, a higher capacity can be delivered in the short term than is actually available on the network connection point. Such charge stores can be installed for this purpose, for example in charging points. Thus, by means of such precharge stores, maximum total charging capacity at a fully-utilized network connection point can be increased.

Precharge stores of this type are customarily configured as batteries, and can be correspondingly expensive. Moreover, the increase in potential peak loads, and the overall increase in available capacity, is also dependent upon the size of the precharge stores. Correspondingly, excessively large precharge stores are avoided, on the grounds of cost. However, a restriction of active capacity at the network connection point of the charging station can then occur relatively frequently.

The German Patent & Trademark Office, in the priority application to the present patent application, has researched the following prior art: US 2013/0229149 A1, US 2014/0139188 A1, WO 2016/120240 A1, the article "A Virtual Power Plant Management Model Based on Electric Vehicle Charging Infrastructure Distribution" by M. Musio et al., the article "Demand Side Management: Demand Response, Intelligent Energy Systems, and Smart Loads" by P. Palensky et al., and the article "Hierarchical microgrid energy management in an office building" by Xiaolong Jin et al.

BRIEF SUMMARY

Provided are cost-effective techniques for the reduction, or the total elimination of capacity bottlenecks in a charging station, in consideration of any restricted capacity on the network connection point to which the charging station is connected.

A charging station is provided for the charging of electric vehicles. This particularly concerns electric cars, but can also relate to other electric vehicles.

The charging station is connected via a network connection point, which is incorporated here as an element of the charging station, to an electricity supply network. A network connection point of this type can be a physical connection point for connecting the charging station, but can also be a measuring point in the electricity supply network, particularly such a point which is arranged at a further distance from a physical connection point in the electricity supply network.

Via this network connection point, electric power is drawn from the electricity supply network. The network connection point assumes a connection capacity value, up to which the charging station can draw a maximum capacity from the electricity supply network. Such a connection capacity value is routinely defined by the technical limitations of the network connection point, but can also be stipulated by the network operator which operates the electricity supply network in the region concerned. In particular, a connection capacity value of this type is defined upon the initial constitution of such a network connection point. Such a definition is customarily based upon an actual physical capacity limit, which can also concern a relevant part of the electricity supply network and, in particular, can also concern a connection line from the network connection point to a remaining part or section of the electricity supply network.

The charging station additionally comprises at least one charging terminal, which is respectively provided for the charging of an electric vehicle. A charging terminal of this type can routinely be constituted in the form of a "charging column", although a plurality of charging terminals can also be combined in a single charging column. In any event, one electric vehicle respectively is charged by means of one charging terminal.

The charging station moreover comprises at least one additional controllable load. This controllable load is an additional controllable load to the at least one charging terminal, as a charging terminal itself also constitutes a controllable load. Accordingly, this at least one additional controllable load is not a charging terminal. Consequently, if a plurality of charging terminals are provided, rather than a single charging terminal, at least one additional controllable load is provided over and above said plurality of charging terminals, which is not a charging terminal. A controllable load of this type, for example, can be a facility of the charging station which is not directly associated with the electric charging of vehicles.

For example, the charging station can be configured as a service station, and a service station of this type generally comprises one further, and generally extensive infrastructure such as, for example, a restaurant. Such a restaurant, to pursue this example, can incorporate, for example, a cold store. This cold store, at least intermittently, can be actuated or otherwise independently of current cooling demand, as it generally features a high thermal capacity and, in consequence, can temporarily waive capacity for the actuation of the cooling function, with no resulting excessive increase in temperature in the cold store.

The charging terminal further comprises a control device for controlling the charging station. This control device can particularly be provided to coordinate the control of the charging terminals and of the at least one additional controllable load.

In any event, the control device is designed to determine an equivalent storage capacity of a virtual precharge store, and to control the charging of the electric vehicles in accordance with the connection capacity value and the equivalent storage capacity. The equivalent storage capacity describes a value which corresponds to a storage capacity of a virtual electrical precharge store which, for a predefined charging period, can deliver an additional charging capacity, which is dictated by the storage capacity, in order to increase a charging capacity which is restricted by the connection capacity value.

Accordingly, a precharge store is initially assumed which, by means of stored energy, at least in the short term, can deliver additional capacity, which can be employed for charging the electric vehicles. The existing charging capacity can thus be increased by this additional charging capacity. It is assumed that the existing, i.e., the momentarily remaining available charging capacity, is limited by the connection capacity value.

However, it is now assumed that, in place of a precharge store, a virtual precharge store is provided. The virtual precharge store thus behaves in a similar manner to an actual precharge store, wherein it can deliver a corresponding short-term capacity. This can particularly be achieved by the virtual electrical precharge store, wherein capacity from one or more further loads, namely, particularly the at least one additional controllable load, is reduced, as a result of which additional capacity is released, which can be employed as charging capacity. This can also be described as the deployment of additional capacity.

Optionally, capacity can even be increased over and above the connection capacity value, if said at least one additional controllable load draws its power from a network connection point which differs from that via which the charging station otherwise draws capacity for the charging of electric vehicles.

This option can particularly be considered if, by way of a description of one example, a conventional service station was previously present which, naturally, has also drawn electric power from the electricity supply network for various loads. If such a service station is now converted into a charging station, or is extended to incorporate a charging station, an additional network connection point can be installed for this charging station, i.e., for the provision of the capacity required for the charging terminals.

From these possibilities for the control of the at least one controllable load such that an additional capacity can be deployed, an equivalent storage capacity can be defined correspondingly. This equivalent storage capacity, or a given proportion thereof, can be calculated by the integration of the deployable additional capacity over a given time period, particularly the charging period. However, an actual precharge store can also be an element of the virtual precharge store, and the equivalent storage capacity can be correspondingly comprised of the storage capacity of the actual precharge store, and the capacity which can be deployed by the at least one controllable load.

According to one form of embodiment, it is proposed that the control device is designed to determine the equivalent storage capacity at least in accordance with one working point of the at least one further controllable load and the predefined charging period. The working point of the at least one further controllable load can particularly be a present power value, which specifies the momentary power consumption of the controllable load. If this power value can be reduced to zero or to another lower value, particularly for the duration of the predefined charging period, a deployable quantity of energy is constituted which, specifically, in the event of such a capacity reduction of the controllable load, would not be consumed by the latter. This deployable energy can constitute the equivalent storage capacity, in the absence of any further element, or is added to the equivalent storage capacity. This can then be comprised, for example, of further such savable quantities of energy from further controllable loads.

Optionally the charging station can further comprise an electrical precharge store, i.e., a physical store. To this end, it is proposed that the control device is designed to additionally determine the equivalent storage capacity in accordance with an actual storage capacity of the electrical precharge store. The actual storage capacity of the electrical precharge store particularly describes a quantity of energy which is present in, and is retrievable from the precharge store. The equivalent storage capacity can thus be constituted, for example, of the actual storage capacity and at least one quantity of energy which is deployable as a result of the reduction of a load. Further deployable quantities of energy can also be included.

According to one configuration it is proposed that, for determining the equivalent storage capacity, a charging status of the at least one charging terminal is considered, where at least two electric vehicles are being charged, and the charging capacity of at least one electric vehicle can be reduced, such that a charging capacity of a further electric vehicle can thus be increased. In this case, in particular, this reducible charging capacity, over a predefined time period, can be integrated as a deployable quantity of energy, or can be considered as a deployable quantity of energy.

Accordingly, a quantity of energy which is thus deployable by a reduction of charging capacity can be counted as the equivalent storage capacity, or can be supplemented, as described above with reference to a further controllable load. This is based specifically upon the consideration that at least one electric vehicle, by means of high-speed charging, is to be charged as rapidly as possible, whereas it is not necessary for the at least one further electric vehicle to be charged by a high-speed charging process. In particular, for this further electric vehicle, a longer time period can be specified, during which said vehicle is to be charged. It is conceivable, for example, that the charging station forms part of a rest stop and that, while one of the vehicle drivers wishes to travel on as soon as possible, the other might wish to use the charging time of their vehicle as a rest period. Thus, for the at least one electric vehicle, the charging capacity of which can be reduced, a charging period can be specified which is available for the charging of this electric vehicle, wherein this charging period is sufficiently long that it permits a reduction in the charging capacity of said electric vehicle.

The charging station is preferably characterized in that the control device is designed to deliver electric power from the precharge store in order to support the electricity supply network, particularly in consideration of the equivalent storage capacity. It has thus been observed that the charging station, if it incorporates a precharge store, can also be employed for the injection of electric power into the electricity supply network. In principle, the charging station constitutes a load for the electricity supply network but, in exceptional cases, for example in the event of a substantial short-term increase in capacity demand on the electricity supply network, can nevertheless be employed for the fulfilment of this capacity demand by the injection of electric power from the precharge store. In particular, the frequency on the electricity supply network is observed, and electric power is then injected into the electricity supply network if a predefined limiting frequency value is undershot.

Support of the electricity supply network by the use of electric power from the precharge store is particularly executed in consideration of the equivalent storage capacity. In particular, a control function can be provided for this purpose, such that the charging operation of the charging station is maintained. The equivalent storage capacity can thus be considered, for example, such that a proportion thereof is employed for charging connected electric vehicles, whereas a further proportion thereof is employed for injection into the electricity supply network. It should be observed that, in this case, the equivalent storage capacity is comprised of an actual storage capacity of the precharge store and a quantity of energy which is deployable from controllable loads.

The control device is preferably designed to identify a potential capacity reduction on the at least one additional load for the predefined charging period, and to determine the equivalent storage capacity accordingly. Consideration of the working point of the corresponding controllable load can thus be undertaken, wherein a check is executed, at the present working point, of the extent to which the power take-up thereof can be reduced.

The control device is preferably designed to identify, and particularly to predict a temporary charging capacity bottleneck and/or a temporary reduction of the connection capacity value and, in accordance therewith, to determine the charging period and/or the equivalent storage capacity. This is particularly based upon the consideration that, at the network connection point, as a result of technical dictates and/or at the instruction of the network operator of the electricity supply network, power take-up from the electricity supply network may be reduced. A temporary charging capacity bottleneck may be present as a result. A temporary reduction of the power available for take-up at the network connection point can be described as a temporary reduction of the connection capacity value. A bottleneck or reduction of this type can preferably be predicted in that, for example, network behavior over the course of a day is known. For example, specific times may be known, at which a bottleneck or a reduction of this type occurs. However, it should also be observed that a bottleneck or a reduction of this type may be notified, particularly by the network operator. It should also be considered that, in the event of a high proportion of regenerative generating facilities, a capacity bottleneck is predictable, according to the weather conditions and/or the time of day.

A charging period can be determined accordingly. It should be observed that, in principle, a charging station, particularly a charging station which is configured as a public service station, will charge electric vehicles at all times, or at least for the majority of the time. A charging period is thus a specific time segment, for example of the order of 10 minutes or 1 hour, or within a range of 10 minutes to 1 hour, in which the charging of one or more electric vehicles is scheduled. If a temporary charging capacity bottleneck or a temporary reduction of the connection capacity value of a specific duration is identified or predicted, this time period which, in this case, can also be described as the problem period, can be defined as the charging period. However, the charging period is not necessarily identical to the problem period, but can also commence, for example, somewhat beforehand and terminate somewhat thereafter—this can be a rational option, particularly for the prediction of the problem period, in order to offset any uncertainties in prediction.

Particularly according to the problem period, or the charging period which has been determined in accordance therewith, the equivalent storage capacity can then be determined. In particular, the respectively available capacity over the charging period can be integrated with the storage capacity. The resulting outcome is that the equivalent storage capacity has thus been defined and, in accordance with the latter, the charging of electric vehicles for the charging period thus defined can be controlled. This charge control function is thus essentially dissociated from physical control mechanisms for the delivery of charging capacity, i.e., for example, the actuation of an additional controllable load. It is only necessary for this equivalent storage capacity to be considered.

Preferably, for the delivery of capacity which has been considered for the determination of the equivalent storage capacity, a corresponding control is naturally executed as to how, for example, the capacity of a controllable load is to be activated, such that the consumption of the latter is reduced. Control of the precharge store, if present, can also be required in order to deliver the requisite charging capacity. However, these control functions for the delivery of capacity may be dissociated from the control of charging of the individual vehicles. In other words, the control function which controls the charging of electric vehicles will not necessarily be aware whether a precharge store with a satisfactory state-of-charge is available, whether the capacity concerned is available for take-up from the network at the network connection point, or whether a controllable load will permit the deployment of further capacity.

According to one form of embodiment, it is proposed that the charging period is determined in accordance with at least one electric vehicle to be charged, particularly in accordance with a charging characteristic of the respective electric vehicle to be charged, and the equivalent storage capacity is then determined in accordance therewith. In this form of embodiment, accordingly, the charging period is not based upon the above-mentioned problem period, but upon an actual time period for the charging of an electric vehicle, or a proportion thereof. The considerations described in conjunction with the problem period can nevertheless be observed additionally.

Consideration of a charging characteristic of a respective electric vehicle to be charged is based particularly, if not exclusively, upon a high-speed charging operation in which, intermittently, very high charging currents are required for the purposes of charging. However, it should be observed that, at the start of charging, charging characteristics routinely assume a very high charging current, which can then be reduced at the end of the charging process. The exact profile over time of such a charging current, or potential charging current, can be considered here as the charging characteristic.

A charging characteristic of this type gives rise to a charging period during which, however, the desired charging current is not constant. Particularly on these grounds, it is also proposed that the consideration of charging capacity should be based upon a given storage capacity, i.e., an available quantity of energy, rather than upon a capacity value. It is therefore proposed that, specifically in this case, an equivalent storage capacity should also be determined, namely, for this charging period. This equivalent storage capacity, i.e., the quantity of energy available for the charging period, can then be called-up by the variable, or at least non-constant employment of a charging capacity.

Accordingly, an equivalent storage capacity is a quantity of energy for a predefined time period, which can be comprised of a plurality of components. One component can be an actual quantity of energy, of the type which is stored in a precharge store. A further component is quantity of energy which can be deployed by the reduction of at least one further load during the predefined time period. In this case, in the event of a plurality of such controllable loads, a plurality of quantities of energy are also available for consideration.

According to a further form of embodiment it is proposed that the at least one additional controllable load is an absolutely variable controllable load which, as required, can be operated in a partially or totally reduced manner, and is particularly configured as a productive load, the productive quantity of which can be reduced by means of actuation by the control device. Accordingly, such a load is specifically controllable by means of the control device. In particular, this is a load, the function of which does not need to be executed immediately and in full, but can at least be executed in a partially variable manner. One example is a productive load which, for example, generates a gas such as, for example, hydrogen or methane. This gas can then be injected into a pipe network, or collected in a tank. If a substantial capacity is available, on the grounds that limited charging capacity is required, this load can then operate, and can produce the corresponding gas by means of, or from the capacity required for this purpose. However, if a substantial charging capacity is required for the charging of electric vehicles, the power take-up of this load can be curtailed, or even reduced to zero. A deployable quantity of energy is available accordingly.

Additionally or alternatively, the at least one additional controllable load comprises a load which operates in a time-delayed manner, the function of which can optionally be totally or partially delivered with a time delay, such that a working capacity can be reduced in a given period, where said capacity is then delivered in another period.

One example is the above-mentioned cold store which, in principle, is required to deliver essentially a specific cooling capacity which, however, on the grounds of the high thermal capacity available, can be distributed over the course of the day, and delivered earlier or later. The power required by this time-delayed operable load can be reduced, on the grounds that this power will then be increased later. Overall, in consequence, no additional energy is deployable, but the deployment thereof is intermittent. In particular, deployment of additional energy for a given period has been recognized as important in this context and, in consequence, the employment of such a time-delayed operable load is both rational and advantageous.

A charging capacity is preferably divided into a fixed element and a variable element, wherein the variable element is controllable, and the equivalent storage capacity is determined in accordance with said variable element.

The variable element of charging capacity can thus be considered in the equivalent storage capacity. If, for example, a vehicle commences charging which has a high fixed charging requirement, and a plurality of vehicles are being charged which have a high variable element, the first vehicle can access a large equivalent store, which is constituted by the variable elements of the charging currents of the other vehicles.

It is also conceivable that the variable element of charging capacity might increase with a rising state-of-charge. Thus, for example, high-speed charging to an 80% state-of-charge might be delivered, whereas charging to 100% involves a large variable element, as this does not assume such a high priority.

The control device is preferably designed, particularly in accordance with the equivalent storage capacity, to control the charging of the at least one electric vehicle and, in each case, to stipulate at least one target charging value or an available charging capacity on the relevant charging terminals. It is therefore proposed that the equivalent storage capacity should be employed in a correspondingly targeted manner for the control of the charging of electric vehicles. One variant, which is recognized as particularly appropriate, is the stipulation, for this purpose, of a target charging value or an available charging capacity on the relevant terminals. This superordinate control function, which takes account of the equivalent storage capacity, does thus not need to execute, in an individual manner, the actual control of the charging of each individual electric vehicle but, according to the equivalent storage capacity, generates corresponding guideline values only. Depending upon these guideline values, which include the above-mentioned target charging values and the above-mentioned available charging capacities, each charging terminal, or another subordinate control function, can thus execute the specific control of the respective electric vehicle.

Additionally or alternatively, it is proposed that the control function is designed, particularly in accordance with the equivalent storage capacity, to control a take-up or release of electric power by the electrical precharge store. This take-up or release, i.e., the control of the actual precharge store, thus additionally considers the equivalent storage capacity. If, for example, the equivalent storage capacity is high and the state-of-charge of the electrical precharge store is low, injection of energy into the precharge store can be considered. If, however, the equivalent storage capacity is low, charging of the actual precharge store, having a low state-of-charge, can nevertheless be deferred initially.

In this context, equivalent storage capacity time horizons are particularly relevant. Thus, for example, in the event of non-use, charging can be displaced from the equivalent storage capacity to the actual store, as the quantity of energy can be held for longer periods in an actual store. Once the actual store has been charged, a recharging of the equivalent storage capacity is also required wherein, namely, displaced capacity, which has been temporarily reduced and has thus contributed to this equivalent storage capacity, is restored wherein, however, in the event of further free network capacities on the electricity supply network, this can be executed at the network connection or, where necessary, from the actual store. In the best case, thereafter, both actual and equivalent storage capacities are available in full.

Additionally or alternatively, it is proposed that the exchange of electric power via the network connection point is likewise controlled by the control device, particularly in accordance with the equivalent storage capacity. This functionality is thus proposed for the control device, which can thus additionally execute a central control function at this point. The exchange of electric power via the network connection point particularly involves a control of the magnitude of power take-up from the electricity supply network. It is also conceivable, at least in exceptional cases, for electric power to be injected into the electricity supply network. Again, according to one form of embodiment, this is to be executable by the control device. However, the control unit can at least execute a virtual injection, wherein consumption is reduced, and is then restored within a given time period. From a network perspective, i.e., for the electricity supply network, this is equivalent to an injection.

Additionally or alternatively, it is proposed that the control device, particularly in accordance with the equivalent storage capacity, additionally controls the at least one additional load. Here again, this control function can advantageously be executed centrally by the control device, which thus not only calculates the equivalent storage capacity, but also controls the call-up of corresponding power or energy, and can thus deliver appropriate energy for the charging of electric vehicles.

A method for controlling a charging station for charging electric vehicles is further proposed. The charging station comprises:
- a network connection point, via which the charging station is connected to an electricity supply network, for the take-up of electric power from said electricity supply network, wherein the network connection point assumes a connection capacity value, up to which a maximum take-up of power from the electricity supply network can be executed by the charging station;
- at least one charging terminal, for the charging of one electric vehicle respectively;
- at least one additional controllable load to the at least one charging terminal; and
- a control device for controlling the charging station.

On the basis of such a charging station, the method comprises the following steps:
- determination of an equivalent storage capacity of a virtual precharge store; and
- control of the charging of electric vehicles in accordance with the connection capacity value and the equivalent storage capacity, wherein
- the equivalent storage capacity describes a value which corresponds to a storage capacity of a virtual electrical precharge store which, for a predefined charging period, can deliver an additional charging capacity which is dictated by said storage capacity, in order to increase a charging capacity which is limited by the connection capacity value.

A method is thus proposed which executes the steps for which the control device of a charging station according to at least one of the above-mentioned forms of embodiment has been designed. In particular, an equivalent storage capacity is determined accordingly, and the charging of electric vehicles is controlled in accordance with the connection capacity value and the equivalent storage capacity thus determined.

In particular, the steps of the method are executed or controlled by means of the control device.

Descriptions of the mode of operation of the charging station, and particularly of the mode of operation of the control device, apply correspondingly to the respectively corresponding process steps.

An exemplary and detailed description of one form of embodiment of the invention is presented hereinafter, with reference to the accompanying FIGURE.

BRIEF DESCRIPTION OF THE SEVERAL VIEWS OF THE DRAWINGS

FIG. 1 to this end, shows a schematic representation of a charging station.

DETAILED DESCRIPTION

FIG. 1 thus represents a charging station 200, having a first and a second charging terminal 201, 202. The first and second charging terminals 201, 202, in principle, are also representative of further charging terminals. For the purposes of this description, the first charging terminal 201 constitutes such a terminal which is also suitable for high charging capacities, particularly for high-speed charging capacities, whereas the second charging terminal 202 is a standard charging terminal. In principle, it can be provided that the second charging terminal 202 is also configured in the manner of the first charging terminal 201 and, in particular, also possesses a high-speed charging capability. Each charging terminal can also be alternatively described as a charging point. This applies to both the first and the second charging terminals 201, 202.

As a further optional element, an actual electrical precharge store 204 is provided in the charging station 200. This optional precharge store 204, if required, can particularly deliver an additional capacity for the charging of electric vehicles. In particular, the precharge store 204, if required, can deliver an additional charging capacity to at least one charging terminal, i.e., to the exemplarily designated first charging terminal 201 and/or to the second charging terminal 202. This can be best executed where, on one, or particularly on a plurality of charging terminals 201, 202, a short-term high demand for charging capacity is present. It should be repeated that the two charging terminals 201, 202 can be representative of a plurality of charging terminals. If, for example, 20 charging terminals are provided, a high capacity demand can then arise, particularly if many or all of these exemplary 20 charging terminals are in use. In the event of the assumption of a high-speed charging operation or a plurality of high-speed charging operations, a high capacity demand for charging can also occur.

The charging station 200 moreover comprises a rest stop, optionally with a conventional service station, i.e., a service station for the tank storage of fossil fuels. This rest stop is identified here as rest stop 206, and thus constitutes a further load, which is at least partially controllable. Partial controllability applies on the grounds that certain elements are controllable, such as a heating system for heating the building, whereas others are not controllable, such as, for example, an elevator or kitchen appliances in the rest stop.

As a further load, a thermal store 208 is additionally represented. This thermal store 208 can heat up either itself or a storage medium, by the corresponding input of power, and can emit this heat as required, for example in the form of heating air or warm water. For example, such a thermal store can heat up the storage medium, for example water, and warm water can then be extracted as required, particularly from the upper region of a warm water store of the thermal store 208. Customarily, reheating is then executed. If, however, notwithstanding the extraction of warm water, no reheating is executed in the first instance, this will initially have no, or no perceptible effects, as a warm water store of this type is routinely filled with cold water in the lower region only, which then undergoes heat-up. The replenished cold water does not momentarily reach the upper region, such that there is no impact, or virtually no impact upon the extraction of warm water, even where the replenished cold water is not heated up immediately.

For the supply of the charging station 200, particularly the charging terminals 201 and 202, the optional precharge store 204, the rest stop 206 and the thermal store 208, which is representative of other or further loads, the charging station is connected via a network connection point 210 and, for example, a transformer 214, to an electricity supply network 216. On the network connection point 210, by way of illustration, an isolating switch is represented which, in normal duty, is naturally closed.

For the rest stop 206 and the thermal store 208, which are both representative of further loads, a dedicated load network connection point 211 can be provided if, moreover, for the charging terminals 201 and 202, and optionally for the optional precharge store 204, a charging network connection point 212 is provided. The load network connection point 211 and the charging network connection point 212, by way of illustration, are also provided with an isolating switch, which isolating switches are also closed in normal duty, and are only shown here in the open position for the purposes of representation.

The network connection point 210, as represented in FIG. 1, can be divided into the load network connection point 211 and the charging network connection point 212, or the load network connection point 211 and the charging network connection point 212 respectively constitute actual stand-alone network connection points, such that the network connection point 210 would then be dispensable. However, it is also conceivable that only the network connection point 210 is present, via which, in the absence of the load network connection point 211 and the charging network connection point 212, the entire charging station is connected to the electricity supply network 216.

In particular, the employment of one network connection point only, namely, network connection point 210, is conceivable if the charging station, including the rest stop and any further loads, such as the thermal store 208, are being planned and constructed entirely from scratch. Particularly in the event that a rest stop, optionally with further loads, is already present, it is conceivable that the latter is connected via a network connection point, such as the load network connection point 211, to the electricity supply network 216. If an infrastructure for the charging of electric vehicles is then added, i.e., particularly by the inclusion of charging terminals such as the first and second charging terminal 201, 202, and optionally of the precharge store 204, an additional network connection point, such as the charging network connection point 212, can be provided for this purpose.

In normal duty, the charging station 200 draws a network capacity 220 from the electricity supply network 216, which is distributed to all the loads in the charging station 200, namely, to the first charging terminal 201, the second charging terminal 202, the rest stop 206 and the thermal store 208. If the optional precharge store 204 is also present, this can also draw power from the network capacity 220, wherein this can also constitute a negative contribution, if the precharge store is drawing power rather than injecting power. In FIG. 1, correspondingly, power flows are illustrated by arrows, namely, a first charging capacity 221, which flows to the first charging terminal 201, a second charging capacity 222, which flows to the charging terminal 202, a first load capacity 226, which flows to the rest stop 206, and a second load capacity 228, which flows to the thermal load 208. For the optional precharge store 204, a storage capacity 224 is indicated, which is delivered by the precharge store 204.

The sum of the first and second charging capacities 221, 222 and the first and second load capacities 226, 228, minus the storage capacity 224, thus corresponds to the network capacity 220.

If, for example, an increased demand for charging capacity is suddenly present on the first charging terminal 201, on the grounds that, for example, a corresponding vehicle is to be charged which is rated for a very high charging capacity, wherein the call-up of said high charging capacity is also required, the first charging capacity 221 will need to be increased accordingly. To this end, the network capacity 220 will need to be increased by the same magnitude. If, however, the network capacity 220, at the time at which this increased charging demand arises, is already at its maximum limit, it cannot be subject to any further increase. Accordingly, the additional capacity required in order to supply the first charging capacity 221 cannot be delivered.

It has been established, however, that this additional capacity can nevertheless be delivered, if the remaining capacities can be adjusted correspondingly. For example, the second charging capacity 222 might be reduced, the first load capacity 226 might be reduced, the second load capacity 228 might be reduced and/or the storage capacity 224 might be increased. For example, each of these four above-mentioned capacities can deliver a small contribution which, potentially, may be sufficient to satisfy the increased capacity demand for the first charging capacity 221. It should be observed that, particularly in the case of a high-speed charging capacity, only a few minutes will be required for this purpose in many cases. This is generally dictated by the charging characteristic of the corresponding battery which is to be charged. Routinely, this increased demand is thus only of a few minutes' duration.

In order to permit an initial appraisal as to whether this increased demand for the first charging capacity 221 can be fulfilled at all for this short period, which is designated here as the predefined charging period, it is proposed that an equivalent storage capacity should be determined. Accordingly, this equivalent storage capacity indicates a storage capacity of a virtual precharge store. For the purposes of illustration, the second charging terminal 202, the precharge store 204, the rest stop 206 and the thermal store 208 are combined here to constitute a virtual precharge store 230. The virtual precharge store 230 is particularly characterized in that it does not have an actual capability for energy storage, or only partially by means of the actual precharge store 204, and correspondingly for the take-up or delivery of power, but can also control a power flow, specifically by the deferral thereof in time. A power output from an actual store is associated with a reduction of power take-up by the virtual precharge store. In other words, the exemplarily described increased capacity demand for the first charging capacity 221 can be fulfilled, wherein the virtual precharge store 230 executes a smaller take-up of the corresponding capacity, in accordance with the increased capacity demand for the first charging capacity 221, and thus consumes less. Naturally, this can also signify that the virtual precharge store actually delivers a positive capacity, if the output storage capacity 224 of the actual precharge store 204 is correspondingly large. Routinely, particularly if the precharge store 204 is not present, a reduction in the capacity of the precharge store signifies that, even after said reduction, the take-up and consumption of power by elements of the virtual precharge store 230 will continue, but to a lesser extent than previously.

In order to permit the management of resources using the capacity of this virtual precharge store 230, an equivalent storage capacity is defined. Fundamentally, this considers only the potential by which the power take-up of the virtual precharge store 230 can be reduced, and relates this to the predefined charging period, i.e., the time, for example, during which the above-mentioned increased capacity demand for the first charging capacity 221 is in force. This can take account of the time period, or can constitute the time period during which specific loads can be reduced.

Depending upon the predefined charging period, this equivalent storage capacity can then be determined by the extent to which the power of the second charging capacity 222 can be reduced, the extent to which the storage capacity 224 can be increased in the predefined charging period, the extent to which the first load capacity 226 can be reduced in the predefined charging period, and the extent to which the second load capacity 228 can be reduced in the predefined charging period, and for how long this is possible. Naturally, it can also be taken into account that one or more of the above-mentioned capacities may not be susceptible to a constant and consistent variation over the predefined charging period. Ultimately, the outcome thus generated is only a single value for the equivalent storage capacity. Depending upon this value, the extent to which the exemplary above-mentioned increased demand for the first charging capacity 221 can be satisfied can be appraised, and the first charging terminal 201 can be controlled correspondingly.

All these calculations of the equivalent storage capacity can be executed by means of a control device 232, and this control device 232 is representatively linked here to the first and second charging terminals 201, 202 and the optional precharge store 204. It is thus intended to indicate that the control device 232 is particularly provided for these elements of the charging station 200. However, it has particularly been acknowledged that further loads such as the above-mentioned exemplary rest stop 206, and the likewise only exemplarily represented thermal store 208 might also be included. Preferably, in this case, the control device 232 additionally executes the concurrent control of further such loads, such as the rest stop 206 and the thermal store 208.

The control device 232 can also be configured for the injection of electric power into the electricity supply network 216 and, to this end, can particularly actuate or incorporate a bidirectional inverter. By means of such a bidirectional inverter, electric power can thus be drawn from the electricity supply network 216, and can also be injected. This arrangement is proposed for any forms of embodiment. In particular, it is generally proposed that the charging station is coupled to the electricity supply network via a bidirectional inverter, via which, optionally, electric power can be drawn from the electricity supply network and electric power can be injected into the electricity supply network. By means of a bidirectional inverter of this type, in conjunction with both the take-up of electric power and the injection of electric power, inter alia, a reactive power adjustment can be executed.

If only one network connection point 210 is present, the first charging capacity 221, at its maximum, can correspond to the network capacity 220, subject to the addition, where applicable, of the capacity which can be delivered by the precharge store 204, where present.

However, in the event of a topology in which two network connection points are present, such as the load network connection point 211 and the charging network connection point 212, the first charging capacity 221 is not limited to the capacity which can be delivered at the charging network connection point 212, subject to the addition, where applicable, of the storage capacity 224, but can additionally incorporate capacity which is delivered via the load network connection point 211, at least in part. Although the topology represented schematically in FIG. 1 does not show such a connection, this connection can be present, or can be provided.

In other words, particularly in the event that a rest stop, such as the rest stop 206 is expanded to incorporate the charging of electric vehicles, this expansion can thus be achieved by means of the newly-provided charging network connection point 212. In principle, this charging network connection point 212 would then dictate a capacity limit for the maximum charging capacity, if no precharge store 204 is present. However, it has been observed in this context that, in any event for short-term high capacity requirements, which are routinely only of a few minutes' duration, at least a proportion of capacity can be further incorporated which is taken up by the further loads, i.e., particularly by the rest stop 206.

All the above arrangements are particularly planned and controlled such that the equivalent storage capacity is respectively determined for a predefined charging period. This can also signify that, in the event of a twin network connection point topology, i.e., incorporating the charging network connection point 212 and the load network connection point 211, the maximum capacity of the load network connection point 211 is not exhausted.

It is thus proposed that an overall consideration of all electrical elements, at least insofar as any control intervention therein is possible, should be incorporated in the management of charging capacity. In this case, this is preferably achieved by the determination of an equivalent storage capacity.

The concept is based upon the achievement of the execution of a precharging functionality by means of a virtual store. To this end, controllable loads and deferrable loads, each of which can also be described as loads, together with, optionally, actual stores, are combined to constitute a virtual precharge store.

A precharge store for high-speed e-mobility charging stations, employing the principle of a virtual store, can thus be functionally achieved. An expansion of the capacity of a small precharge store can be achieved by the combination thereof with controllable and displaceable loads to constitute a large storage system with high availability, from a network perspective. Network-servicing or network-supporting operation, in combination with precharge operation, can then be achieved, if an integrated actual store is present. Precharge operation can also be achieved in the absence of actual stores.

It has been considered and observed that, from a network perspective, virtual stores function in the manner of actual stores, but can be constituted from controllable and deferrable loads. Thus, although a correspondingly lower availability can be provided, costs for an actual precharge store can be saved, or a precharge store can at least be dimensioned to a smaller rating.

By means of the simple approach proposed, a charging capacity can be substantially increased in the short term, whilst avoiding any network extension. As a result, optionally, a higher charging capacity can be achieved with equal network connection costs. Thus, optionally, more rapid network connection can also be achieved.

Accordingly, at a comparatively low cost, system services can also be provided.

It has been established that an application of the principle of a virtual store, in the form of a precharge store, for the short-term increase of charging capacity, particularly in a high-speed charging station, is achievable, wherein an actual store can be omitted.

The provision of additional capacity is possible, namely, by means of a virtual store, a deferral of consumption and/or controllable loads or consuming devices.

This can be achieved directly at the charging point, by means of previously charged vehicles, if the charging capacity thereof can be reduced. It can also be achieved by means of loads in close proximity such as, for example, a rest stop, an oven or a refrigeration facility, to name a few examples. In this case, the charging capacity can be divided into a fixed and a variable element. The variable element can be an element of the virtual store.

A virtual store with an integrated actual store can also be employed for system services, and as a precharge store.

Availability of the virtual store is ensured by the actual store. A reduction in the availability of such a virtual store, in the form of a precharge store, i.e., for the charging of electric vehicles, in favor of the provision of system services, is proposed as an advantageous variant.

The invention claimed is:

1. A charging station comprising:
a network connection point, wherein the charging station is connected to an electricity supply network via the network connection point and configured to receive electric power from the electricity supply network, wherein the network connection point has a connection capacity value, up to which a maximum power can be received from the electricity supply network by the charging station;
at least one charging terminal configured to charge an electric vehicle;
at least one additional controllable load to the at least one charging terminal; and
a control device configured to control the charging station, wherein the control device is configured to:
determine an equivalent storage capacity of a virtual precharge store, and
control the charging of electric vehicles in accordance with the connection capacity value and the equivalent storage capacity,
wherein the equivalent storage capacity describes a value corresponding to a storage capacity of a virtual electrical precharge store which, for a predefined charging period, is configured to deliver an additional charging capacity, which is dictated by the storage capacity, in order to increase a charging capacity which is restricted by the connection capacity value.

2. The charging station as claimed in claim 1, wherein the control device is configured to determine the equivalent storage capacity at least in accordance with:
a working point of the at least one additional controllable load, and
the predefined charging period.

3. The charging station as claimed in claim 2, wherein the charging station comprises an electrical precharge store, wherein the control device is configured to determine the equivalent storage capacity in accordance with an actual storage capacity of the electrical precharge store, wherein the control device is configured to deliver electric power from the electrical precharge store to support the electricity supply network in consideration of the equivalent storage capacity.

4. The charging station as claimed in claim 1, wherein the determining the equivalent storage capacity includes considering a charging status of the at least one charging terminal, wherein at least two electric vehicles are being charged, and wherein the charging capacity of one vehicle of the at least two electric vehicles is reduced, such that a charging capacity of the other vehicle of the at least two electric vehicles is increased.

5. The charging station as claimed in claim 1, wherein the control device is configured to identify a potential capacity reduction on the at least one additional controllable load for the predefined charging period, and to determine the equivalent storage capacity accordingly.

6. The charging station as claimed in claim 1, wherein the control device is configured to identify and predict at least one of a temporary charging capacity bottleneck or a temporary reduction of the connection capacity value to determine at least one of the charging period or the equivalent storage capacity.

7. The charging station as claimed in claim 1, wherein the charging period is determined in accordance with at least one electric vehicle to be charged.

8. The charging station as claimed in claim 1, wherein the at least one additional controllable load comprises:
an absolutely variable controllable load which is configured to be operated in a partially or totally reduced manner, and is configured as a productive load, wherein a quantity of the productive load can be reduced by actuation by the control device.

9. The charging station as claimed in claim 1, wherein a charging capacity is divided into a fixed element and a variable element, wherein the variable element is controllable, and the equivalent storage capacity is determined in accordance with the variable element.

10. The charging station as claimed in claim 3, wherein the control device is configured to:
control the charging of the at least one electric vehicle and, in each case, to stipulate a target charging value or an available charging capacity on the relevant charging terminals,
control a take-up or release of electric power by the electrical precharge store,
control an exchange of electric power via the network connection point, and
control the at least one additional controllable load.

11. The charging station as claimed in claim 1, wherein the at least one additional controllable load comprises a load which operates in a time-delayed manner, a function of load to be totally or partially delivered with a time delay, wherein a working capacity is configured to be reduced in a given period, wherein the working capacity is delivered in another period.

12. The charging station as claimed in claim 1, wherein the charging period is determined in accordance with the at least one electric vehicle to be charged in accordance with a charging characteristic of the respective at least one electric vehicle to be charged, and the equivalent storage capacity is then determined in accordance therewith.

13. A method comprising:
controlling a charging station for charging electric vehicles, wherein the charging station comprises:
a network connection point, wherein the charging station is connected to an electricity supply network via the network connection point and configured to receive electric power from the electricity supply network, wherein the network connection point assumes a connection capacity value, up to which a maximum take-up of power from the electricity supply network can be executed by the charging station;
at least one charging terminal configured to charge an electric vehicle;
at least one additional controllable load to the at least one charging terminal; and
a control device for controlling the charging station, the controlling comprising:
determining an equivalent storage capacity of a virtual precharge store; and
controlling the charging of electric vehicles in accordance with the connection capacity value and the equivalent storage capacity,
wherein the equivalent storage capacity describes a value corresponding to a storage capacity of the virtual precharge store which, for a predefined charging period, is configured to deliver an additional charging capacity, which is dictated by the storage capacity to increase a charging capacity which is restricted by the connection capacity value.

14. The method as claimed in claim 13, wherein the equivalent storage capacity is at least determined in accordance with a working point of the at least one additional controllable load and with the predefined charging period, specifically in that a potential capacity reduction on the at least one additional controllable load for the predefined charging period is identified.

15. The method as claimed in claim 13, wherein the charging period is determined in accordance with at least one electric vehicle to be charged.

16. The method as claimed in claim 13, wherein:
the charging capacity is divided into a fixed element and a variable element, and
the equivalent storage capacity is determined in accordance with the variable element.

17. The method as claimed in claim 13, wherein for the determination of the equivalent storage capacity, a charging status of the at least one charging terminal is considered, wherein at least two electric vehicles are being charged, and the charging capacity of one vehicle of the at least electric vehicle is reduced, wherein a charging capacity of the other electric vehicle of the last two electric vehicles is increased.

18. The method as claimed in claim 13, wherein electric power is delivered from a precharge store to support the electricity supply network in consideration of the equivalent storage capacity, wherein a temporary charging capacity bottleneck or a temporary reduction of the connection capacity value is identified, and wherein the charging period or the equivalent storage capacity is determined.

19. The method as claimed in claim 13, wherein the charging period is determined in accordance with the at least one electric vehicle to be charged in accordance with a charging characteristic of the respective at least one electric vehicle to be charged, and the equivalent storage capacity is then determined in accordance therewith.

* * * * *